United States Patent
Tuck, Jr. et al.

(10) Patent No.: US 8,600,045 B2
(45) Date of Patent: *Dec. 3, 2013

(54) CONFIGURATION FOR ANTIMICROBIAL MULTI-HANDEST TELEPHONE SYSTEM

(75) Inventors: Donald Lee Tuck, Jr., Seaside, CA (US); Andrey A. Bolotnikov, Pacific Grove, CA (US)

(73) Assignee: Language Line Services, Inc., Monterey, CA (US)

( * ) Notice: Subject to any disclaimer, the term of this patent is extended or adjusted under 35 U.S.C. 154(b) by 871 days.

This patent is subject to a terminal disclaimer.

(21) Appl. No.: 12/463,349

(22) Filed: May 8, 2009

(65) Prior Publication Data

US 2009/0304176 A1    Dec. 10, 2009

Related U.S. Application Data

(63) Continuation-in-part of application No. 10/818,690, filed on Apr. 5, 2004, now Pat. No. 7,564,963.

(51) Int. Cl.
*H04M 1/00* (2006.01)

(52) U.S. Cl.
USPC ............................. 379/452; 379/455; 379/395

(58) Field of Classification Search
USPC .......................................... 379/395, 455, 452
See application file for complete search history.

(56) References Cited

U.S. PATENT DOCUMENTS

| | | | | |
|---|---|---|---|---|
| 5,784,456 A * | 7/1998 | Carey et al. | ................... | 379/419 |
| 5,980,620 A * | 11/1999 | Brodie et al. | ............... | 106/15.05 |
| 8,099,054 B2 * | 1/2012 | Tabe | ............................. | 455/63.1 |
| 2002/0146115 A1 * | 10/2002 | Zohn et al. | ..................... | 379/451 |
| 2005/0254639 A1 * | 11/2005 | Rodriguez et al. | ........ | 379/388.04 |
| 2007/0082971 A1 * | 4/2007 | Mocchia | ....................... | 523/122 |

FOREIGN PATENT DOCUMENTS

WO    WO 9724925 A2 *    7/1997

* cited by examiner

*Primary Examiner* — Alexander Jamal
(74) *Attorney, Agent, or Firm* — Patent Ingenuity, P.C.; Samuel K. Simpson (57) ABSTRACT

A multi-handset telephone system has a first telephone handset having an antimicrobial agent situated thereon, a first amplifier that provides built in hearing impaired support, and a first integrated volume control actuator. Further, the multi-handset telephone system has a second telephone handset having the antimicrobial agent situated thereon, a second amplifier that provides built in hearing impaired support, and a second integrated control actuator. The second telephone handset is operably connected to the first handset through a handset cord such that a first user speaks on the first handset and the second user speaks on the second handset to have a face-to face conversation with each other at the same time as having a conversation with a third party remotely.

48 Claims, 6 Drawing Sheets

CONFIGURATION FOR ANTIMICROBIAL MULTI-HANDEST TELEPHONE SYSTEM

RELATED APPLICATIONS

This application is a continuation-in-part application of U.S. patent application Ser. No. 10/818,690 entitled "Multi-handset Telephone System" by Andrey A. Bolotnikov, filed on Apr. 5, 2004, the content of which is incorporated herein by reference in its entirety.

BACKGROUND

1. Field

This disclosure generally relates to the field of multi-handset telephone systems. More particularly, the disclosure relates to a system that permits two people to engage in a face to face conversation at the same time as speaking with a third party remotely.

2. General Background

Systems for permitting face-to-face communication with a phone are known, but they suffer from various disadvantages in that they are not as user friendly as possible and in that they do not function as needed with digital phone systems. For instance, digital PBXs (switches) are produced by several competing companies, and they have proprietary characteristics, which generally prevent different digital phone models from universally working with other digital phone models.

The systems for permitting face-to-face communication may be regularly utilized by a number of different people in an organization. As the handsets in these systems come into close contact with the individuals utilizing them, the handsets provide an unsanitary environment for the spread of germs. As a result, individuals in the organization are more susceptible to getting sick and getting other people in the organization sick. Consequently, productivity in the organization utilizing the system may be hampered.

Further, the systems for permitting face-to-face communication are difficult to utilize by the hearing impaired. As a result, some individuals may not be able to effectively partake in the face-to-face communication. Once again, productivity in the organization utilizing the system may be hampered.

In addition, the systems for permitting face-to-face communication utilize a single volume configuration the face-to-face users. That volume configuration may be fine for one of the participants, but may be too loud or to low for the other participant. Thus, productivity in the organization utilizing the system may be hampered.

SUMMARY

In another aspect of the disclosure, a multi-handset telephone system is provided. The multi-handset telephone system includes a first telephone handset having an antimicrobial agent situated thereon, a first amplifier that provides built in hearing impaired support, and a first integrated volume control actuator. Further, the multi-handset telephone includes a second telephone handset having the antimicrobial agent situated thereon, a second amplifier that provides built in hearing impaired support, and a second integrated control actuator. The second telephone handset is operably connected to the first handset through a handset cord such that a first user speaks on the first handset and the second user speaks on the second handset to have a face-to face conversation with each other at the same time as having a conversation with a third party remotely.

In yet another aspect of the disclosure, a multi-handset telephone system is provided. The multi-handset telephone system includes a first telephone handset having an antimicrobial agent situated thereon. Further, the multi-handset telephone system includes a second telephone handset having the antimicrobial agent situated thereon. The second telephone handset is operably connected to the first handset such that a first user speaks on the first handset and the second user speaks on the second handset to have a face-to face conversation with each other at the same time as having a conversation with a third party remotely. The first user speaks a first language, the second user speaks a second language, and the third party is a language interpreter that provides language interpretation for the first user and the second user.

In another aspect of the disclosure, a multi-handset telephone system is provided. The multi-handset telephone system includes a first telephone handset having an antimicrobial agent situated thereon. Further, the multi-handset telephone system includes a second telephone handset having the antimicrobial agent situated thereon. The second telephone handset is operably connected to the first handset such that a first user speaks on the first handset and the second user speaks on the second handset to have a face-to face conversation with each other at the same time as having a conversation with a third party remotely.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

In one embodiment, a multi-handset telephone system permits at least two users to converse face-to face with a third party. A first base that includes circuitry for communicating with an external telephone line. The first unit has a ringer for signaling when an incoming call is received by the first unit, a cradle for holding a single handset, a first handset, and a handset connection port.

Further, in one embodiment, the multi-handset telephone system has a second base with a cradle and a second handset. The second base is non-rigidly physically connected to the first base and also electrically interconnected to the first base thought that wire. In one embodiment, the non-rigid connection is a flexible wire. For example, the non-rigid connection can be a flexible hardwired connection. A port is provided for the first unit for communicating the signal from the incoming call. An outlet from the second unit splits the telephone signal from the line into a plurality of handset cords.

In addition, in one embodiment, a first handset is connected with a first handset cord and a second handset is connected with a second handset cord. Both handset cords may be connected to the second base. The plurality of handset cords permits a plurality of users in close proximity to speak on the plurality of handsets in a face-to-face situation with a third party. An outlet from the second base may split the telephone signal from the line into the plurality of handset cords.

The multi-handset telephone system may be a digital phone system, and the second base may not have a ringer. One or more switches may be associated with the first handset and the second handset. The connection between the phone units may be effectuated from the outlet in the first base which is the normal outlet to a handset.

In one embodiment, the interconnection is a flexible hardwired connection, and there are one or more switches associated with the telephones.

Further, in one embodiment, persons speaking different languages communicate face-to-face through use of remote interpretation services.

Figure 1:
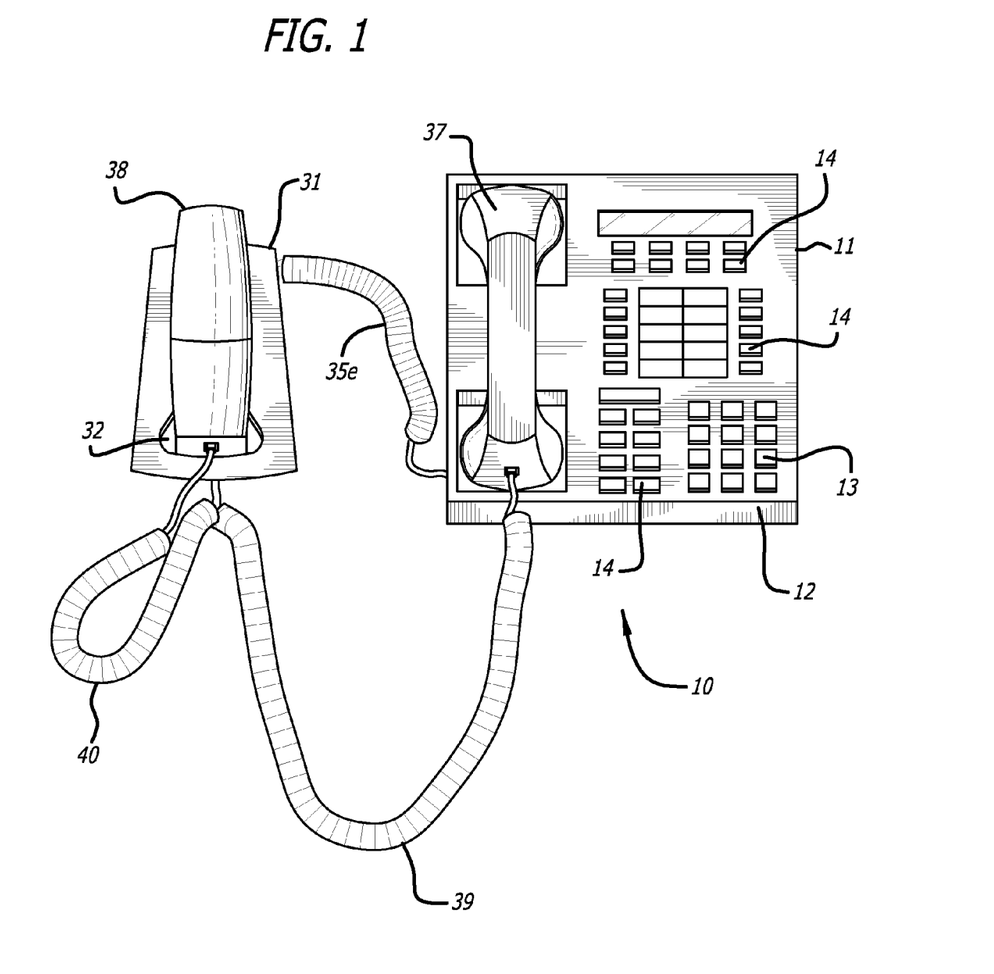
FIG. 1 is a perspective view from the top of a multi-handset telephone system.

FIG. 1 illustrates a perspective view from the top of a multi-handset telephone system 10. The multi-handset telephone system 10 has a primary telephone 11 which includes a base 12. The primary telephone 11 includes a numerical pad 13 for dialing telephone numbers, other multiple control buttons 14, and a first cradle 23 for providing a resting place for a first handset.

Figure 2:
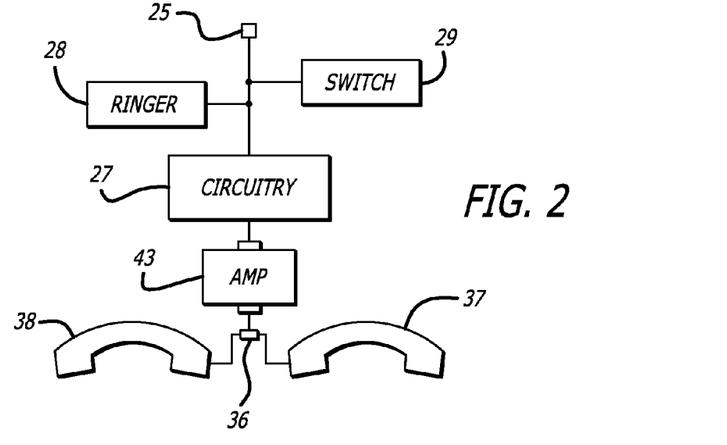
FIG. 2 is a detailed view of the connections in the multi-handset telephone system.
Figure 3:
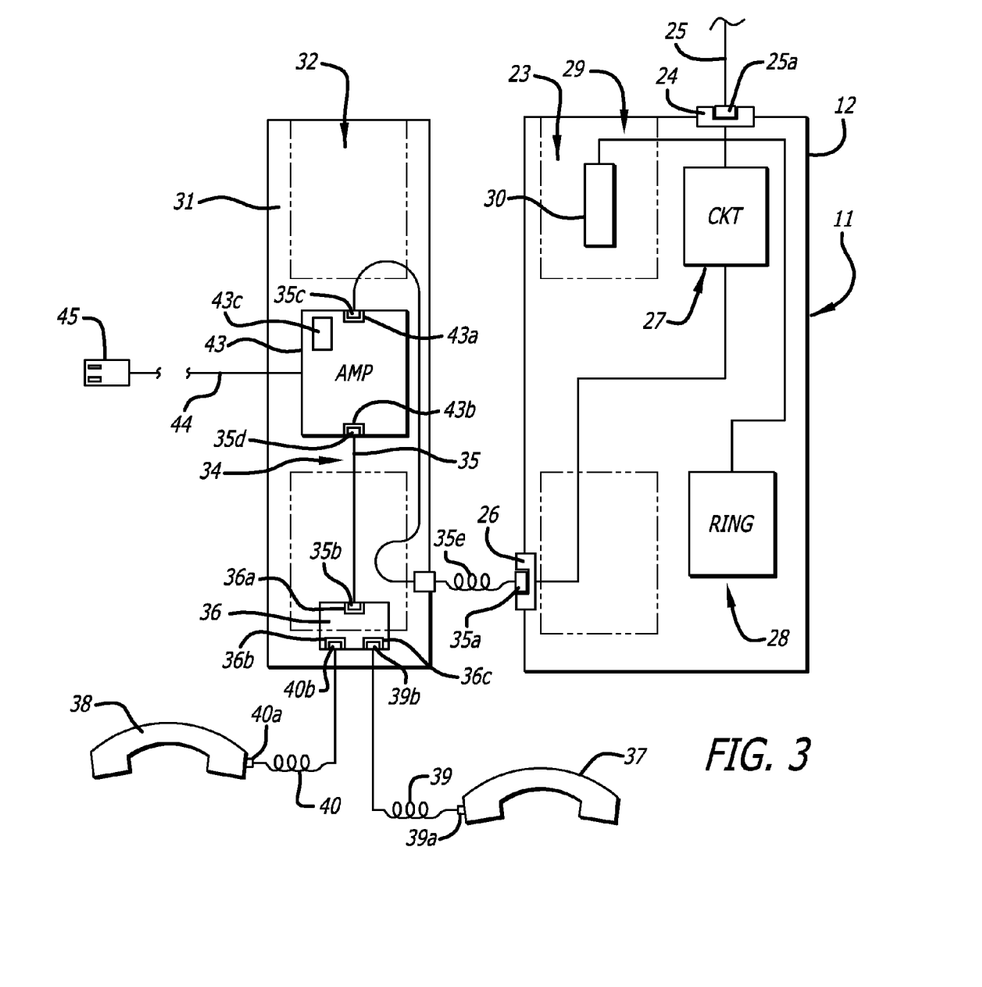
FIG. 3 is a view of the circuitry associated with the multi-handset telephone system.

In one embodiment, the base 12 of primary telephone 11 includes a first jack 24 for connection to an external telephone line 25 and plug 25a and includes a second jack 26 for connection to a handset line. FIG. 2 is a detailed view of the connections in the multi-handset telephone system 10. Circuitry 27 connect first and second jacks 24 and 26 and provides electrical communication between jacks 24 and 26. FIG. 3 is a view of the circuitry associated with the multi-handset telephone system 10. A ringer 28 is operatively connected to the circuitry 27 for signaling when an incoming call is received on the external telephone line 25. A switch 29 is provided on the first cradle 23 for selectively connecting or disconnecting second jack 26 with a signal carried by external telephone line 25. The switch takes the form of a hook switch 30. The primary telephone 11 is a digital telephone 11.

A secondary base 31 may be connected to the primary base 12. The secondary base 31 includes a second cradle 32 for receiving a handset. Secondary base 31 is connected to primary base 12 by a flexible wire 35e.

In yet another embodiment, wiring 34 are disposed in secondary base 31 for connecting second jack 26 to the handset cords of multiple handsets through wire 35e. The wiring 34 includes a wire 35 having a first end 35a connected to second jack 26 and second end 35b connected to a multi-port handset connector 36. The multi-port connector 36 acts as a splitting means for connecting wire 35 to two or more handset cords. The multi-port connector 36 includes port 36a for connection to wire 35 and ports 36b and 36c for connection to handset cords. The multi-port jack 36 may take the form of any splitter which provides a multiplicity of ports for connection to a multiplicity of handset cords.

In one embodiment, the multi-handset telephone system 10 includes a first handset 37 which is positionable in the first cradle 23 and a second handset 38 which is positionable in the second cradle 32. The handsets 37 and 38 are unconnected, independently positionable, and may respectively rest within the respective cradles 23 and 32. A first handset cord 39 connects handset 39, multi-port connector 36, and a second handset cord 40 connects the handset 38 to multi-port connector 36. The handset cords 39 and 40 each include proximal plugs 39a and 40a and distal plugs 39b and 40b. The distal plugs 39b and 40b are plugged into ports 36b and 36c of multi-port connector 36.

Amplification and an external power source may be provided for powering, amplifying and controlling the sound levels of communications transmitted through handsets 37 and 38. The amplification and external power source input additional power into the system and reduce the amount of power which must be supplied by external line 25.

Multiple handsets and conventional telephone functions may be used with the multi-handset telephone system 10 without exceeding the power limit of the single telephone line. The amplification and external power source take the form of an amplifier 43 which is connected to a power cord 44 and plug 45. Plug 45 is pluggable into a standard electrical socket. The amplifier 43 divides line 35 into two segments and is connected to line 35 by jacks 43a and 43b and plugs 35c and 35d on line 35. The amplifier 42 amplifies and powers the signals traveling through line 35 to handsets 37 and 38 and reduces the power which would otherwise be drawn from external telephone line 25. The amplifier 42 and plug 45 can also be used to power two or more handsets so that any desired number of handsets can be used without taking power from external phone line 25. Amplifier 43 may also include a rotary volume control switch 43c for selectively adjusting the sound level of the communications transmitted through the headsets.

In one embodiment, the multi-handset telephone system 10 includes only one circuitry 27, ringer 28, and switch 29 for forming an operable telephone. The handsets 37 and 38 are both connected to multi-port connector 36 so that both handsets 37 and 38 run off of the same circuitry, ringer and switch. The single hook switch 30 of the switch connects or disconnects the handsets 37 and 38 with a signal carried by external telephone line 25.

The multi-handset telephone system 10 may also include an auxiliary ringing means for signaling when an incoming call is received on external telephone line 25.

In another embodiment, the telephone system permits an interpretation service for dialing to a language-specific translator. The multi-handset telephone system 10 allows a first person speaking one language to use handset 37 while another person speaking a different language uses handset 38. A procedure would be as follows. Lift handset 37 for dial tone. Optionally press Button 2 to mute the second handset. Press Button 1 on base 12 to speed dial (or alternatively dial as usual using the keypad of base 11). Remote interpretation service answers. Follow the language selection prompts-interpreter is connected. Provide the handset 38 to the second person to converse.

In yet another embodiment, the multi-handset telephone system 10 allows two or more people to talk on the same telephone line using multiple handsets.

In one embodiment, two buttons may be located on base 12. Button 1 would be a speed dial button generating tone signals going through the wire 35e and further through line 25 to the phone network. This provides for one touch dial access to the remote interpretation service after the primary handset 37 is lifted from the hook 30. The dialer is a programmable unit located inside the base 12. The dialer is powered by the battery. Button 2 is a mute button to cancel the interference from the ambient sound and noise picked up by the handset 38 when the handset 37 is in regular operation.

Figure 4:
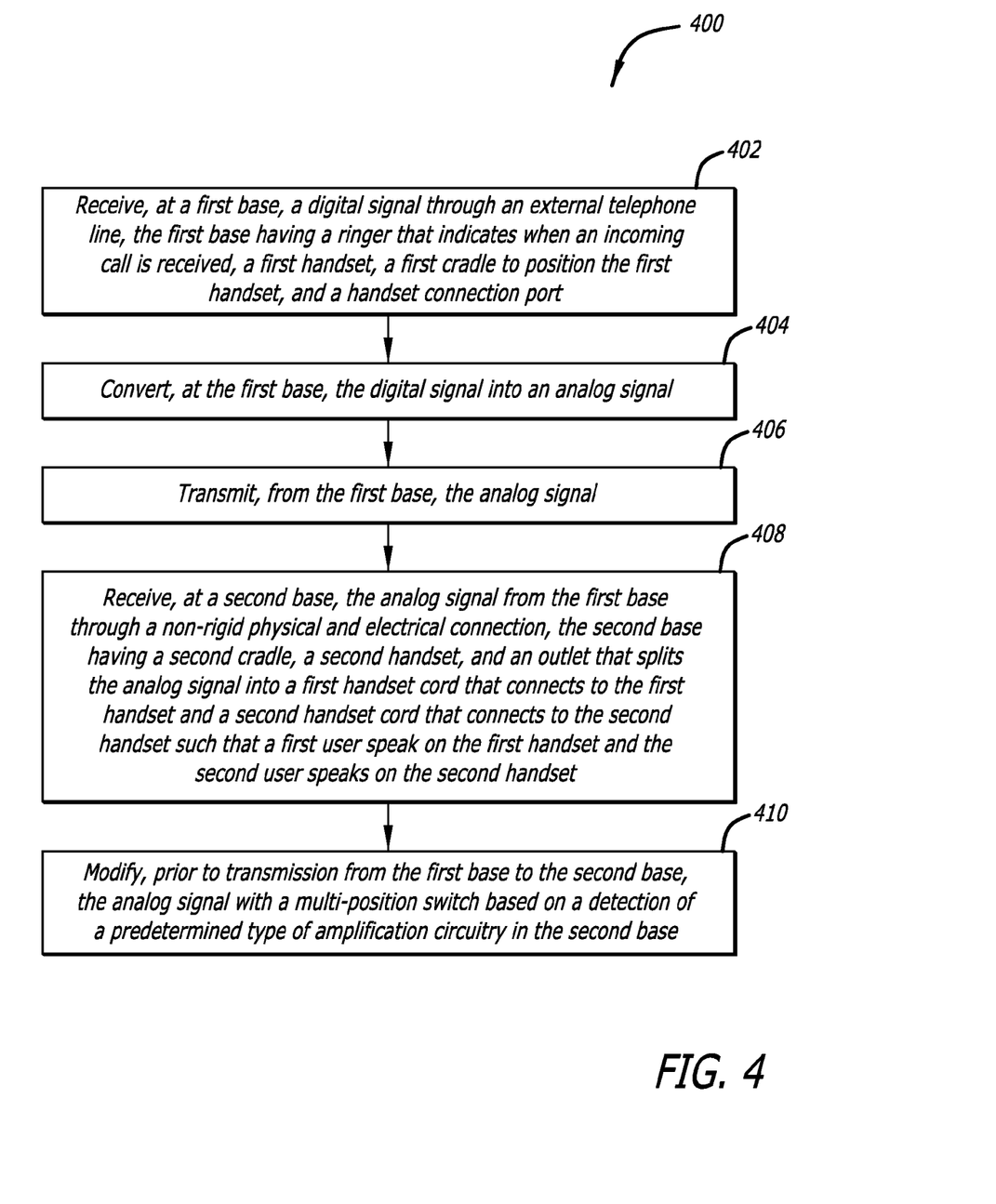
FIG. 4 is a block diagram of the process utilized to implement the multi-handset telephone system.

In another embodiment, the phone base 12 generally uses analog (not a digital) signal between the handset and the main phone base 35e to allow the plurality of handset connections going through it. This allows operation regardless of the PBX brand, with a few exceptions. These would be where some digital phone systems have additional proprietary amplification circuitry built into their handsets, which modifies the analog signal accepted through 35e for normal operation. To address this, the invented phone base 12 has a multi-position switch to change the settings of the analog signal going over 35e. The various signal settings changed by the switch allow universal compatibility with digital phone systems In one embodiment, a process 400 is provided. FIG. 4 illustrates the process 400 At a process block 402, the process receives, at a first telephone base, a digital signal through an external telephone line. The first telephone base has a ringer that indicates when an incoming call is received, a first handset, a first cradle to position the first handset, and a handset connection port. Further, at a process block 404, the process 400 coverts, at the first telephone base, the digital signal into an analog signal. In addition, at a process block 406, the process transmits, from the first telephone base, the analog signal. At a process block 408, the process 400 receives, at a second telephone base, the analog signal from the first telephone base through a non-rigid physical and electrical connection. The second telephone base has a second cradle, a second handset, and an outlet that splits the analog signal into a first handset cord that connects to the first handset and a second handset cord that connects to the second handset such that a first user speaks on the first handset and the second user speaks on the second handset. Finally, at a process block 410, the process 400 modifies, prior to transmission from the first telephone base to the second telephone base, the analog signal with a multi-position switch based on a detection of a predetermined type of amplification circuitry in the second telephone base.

Figure 5:
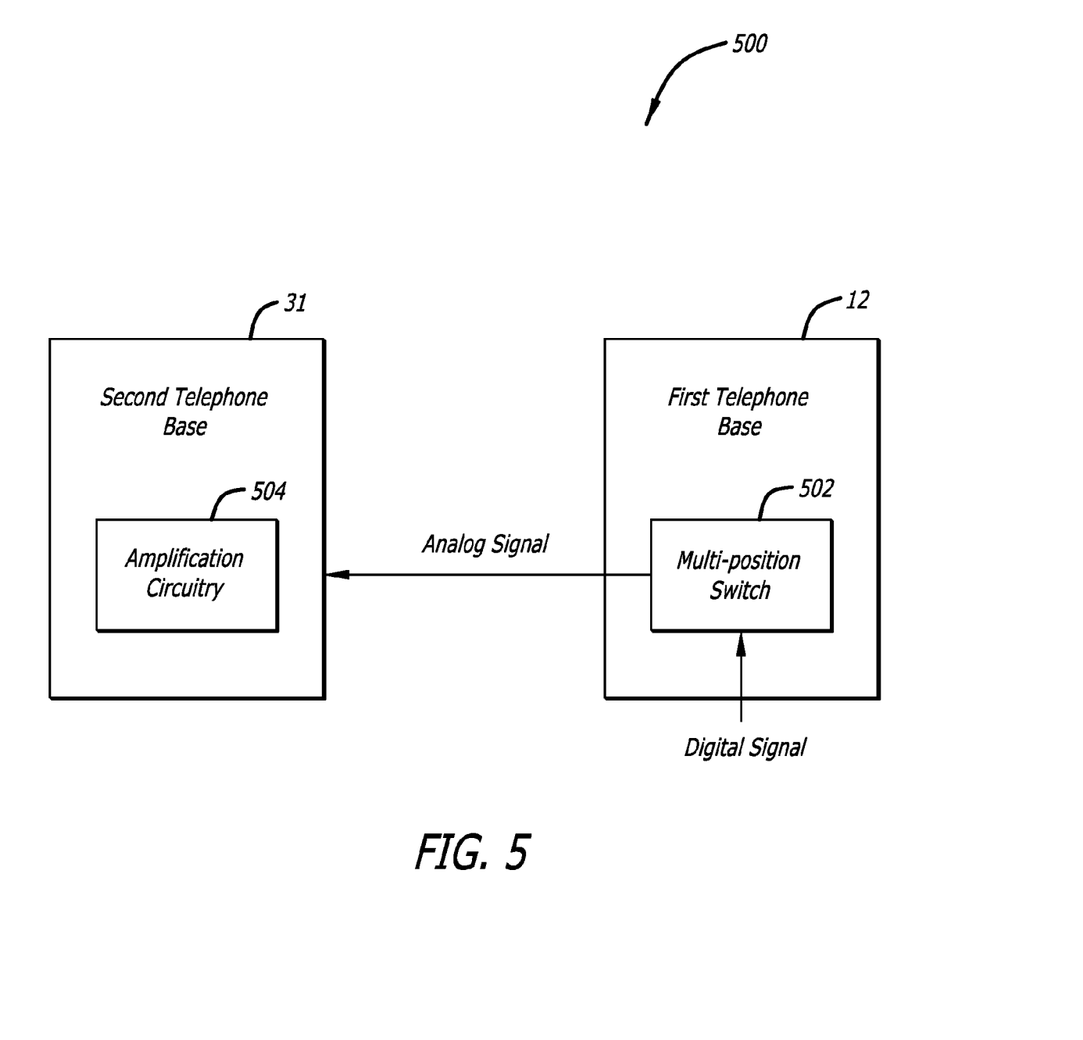
FIG. 5 is another detailed view of the connections in the multi-handset telephone system.

FIG. 5 illustrates a multi-handset telephone system 500. The first telephone base 12 receives a digital signal. A multi-position switch 502 receives the digital signal and modifies the digital signal to an analog signal prior to transmission from the first telephone base 12 to the second telephone base 31. The multi-position switch 502 makes the modification based on a predetermined type of amplification circuitry 504.

A number of variations of the multi-handset telephone system 10 shall now be described. The circuitry and wire connections described above may be utilized with these variations. Further, the variations may be configured such that a single base is utilized for both handsets, different bases are utilized for different handsets, or one or more of the handsets does not utilize a base. A handset may have the input indicators such as buttons on the handset itself or on the corresponding base. An example of a handset not utilizing a base is a cell phone. Accordingly, a cell phone may be connected to a phone with a base. Alternatively, multiple cell phones may be connected.

Figure 6:
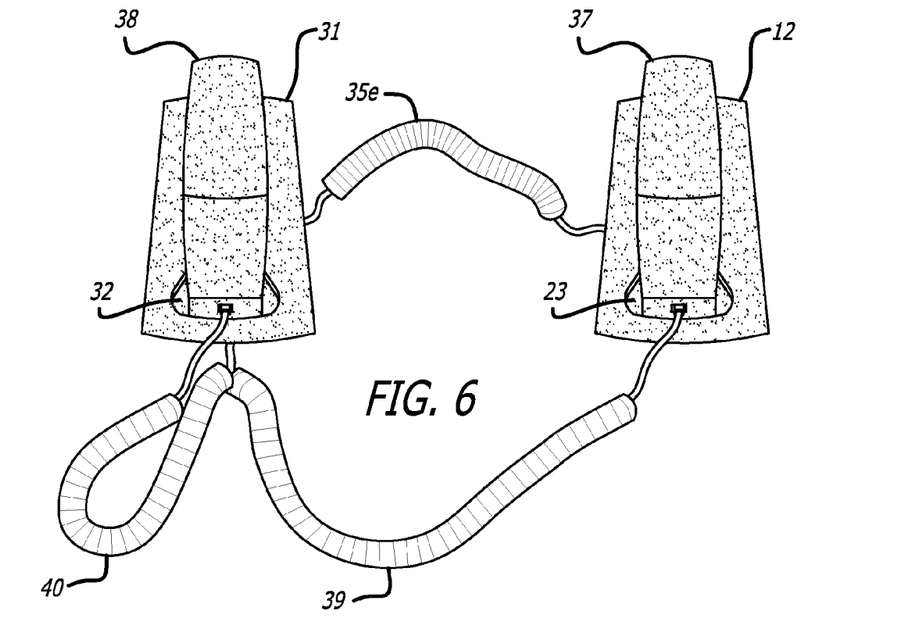
FIG. 6 illustrates a multi-handset telephone system that has an antimicrobial agent.

FIG. 6 illustrates a multi-handset telephone system 600 that has an antimicrobial agent. The shading indicates a layer of the antimicrobial agent placed on the multi-handset telephone system 600. The antimicrobial agent may be situated on the multi-handset telephone system 600 through a coating. For example, the antimicrobial agent may be sprayed on the multi-handset system 600. Other processes of placing the antimicrobial agent on the multi-handset system 600 may also be utilized. In one embodiment, the antimicrobial agent is utilized against germs. The antimicrobial agent may be biocote, polygiene, or any other type of antimicrobial agent.

In one embodiment, the antimicrobial agent is placed on each of the handsets. For example, the antimicrobial agent may be placed on a first handset 37 and a second handset 38. In one embodiment, the same antimicrobial agent is utilized for both handsets. For example, biocote may be utilized for both handsets. In another embodiment, different antimicrobial agents may be utilized for different handsets. For example, biocote may be utilized for the first handset and polygiene may be utilized for the second handset.

The antimicrobial agent may be utilized on other parts of the multi-handset telephone system 600. For example, the antimicrobial agent may be utilized on separate bases for the different handsets, e.g., a first handset base 12 and a second handset base 31, depending on the type of configuration utilized or on a single base for the handsets. The first handset cradle 23 and the second handset cradle 32 may also have the antimicrobial agent. Further, the antimicrobial agent may be utilized on any cords that are utilized for connection purposes. The antimicrobial agent can be utilized with the entire multi-handset telephone system 600. In one embodiment, the antimicrobial agent is situated on the external surfaces of the multi-handset telephone system 600. For example, the antimicrobial agent may be placed on any portion of a handset that may be held without disassembling the handset. As a result, the multi-handset telephone system 600 provides for face-to-face communication with a remote third party in a sanitary environment.

The multi-handset telephone system 600 may be utilized for language interpretation. For example, the first user may speak a first language, the second user may speak a second language, and a remote third party may speak both languages and provide language interpretation. In one embodiment, the multi-handset telephone system 600 may be utilized for language interpretation in the health industry such a hospital, doctor's office, etc. The multi-handset telephone system 600 may also be utilized in other industries.

The multi-handset telephone system 600 may also be utilized without language interpretation. For example, multiple parties may want to have a face-to-face conversation with a remote third party. In one embodiment, the multi-handset telephone system 600 may be utilized for language interpretation in the health industry such a hospital, doctor's office, etc. without language interpretation. The multi-handset telephone system 600 may also be utilized in other industries.

Figure 7:
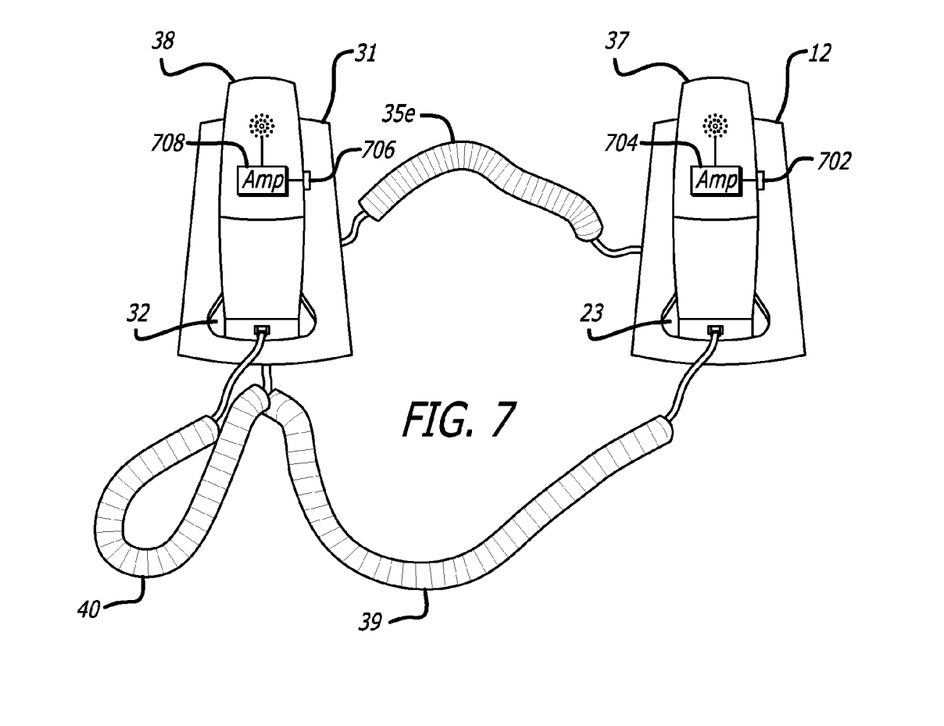
FIG. 7 illustrates a multi-handset telephone system that has amplifiers in each of the handsets to provide built-in hearing impaired support.

FIG. 7 illustrates a multi-handset telephone system 700 that has amplifiers in each of the handsets to provide built-in hearing impaired support. In one embodiment, each of the handsets has an actuator that receives an input from the user to activate the built in hearing impaired support. For instance, the first handset 37 may have a first actuator 702 and the second handset 38 may have a second actuator 706. For example, the user may press a button, turn a dial, etc. to indicate to the multi-handset telephone system 700 that amplification is needed because the user is hearing impaired. Alternatively, the actuators may be in corresponding bases for the handsets, one of the bases for both handsets, or on a single base that receives both handsets. Each of the amplifiers are built in to the handsets. For instance, the first handset 37 may have a first amplifier 704 and the second handset 38 may have a second amplifier 708. Each of the amplifiers may be built into a handset such that the sound emanating from the ear portion of the handset may be amplified. In one embodiment, the user may utilize an actuator to adjust the level of amplification to customize the level of amplification that is utilized as the hearing impairment can vary for different users. For example, a user that is hearing impaired may move a dial amongst different levels of amplification to indicate the level of amplification. In one embodiment, the actuator that indicates the level of amplification may also be utilized to activate the amplification. In another embodiment, different actuators are utilized for activating the level of amplification and indicating the level of amplification. These actuators may be located on any portion of the handsets, e.g., sides, top, bottom, front, or back. Alternatively, these actuators may be located on a corresponding base.

In one embodiment, less than all of the handsets may have amplifiers that provide built-in hearing impaired support. For example, the first handset may have built-in hearing impaired support and the second handset may not have built-in hearing impaired support.

The multi-handset telephone system 700 may be utilized for language interpretation. For example, the first user may speak a first language, the second user may speak a second language, and a remote third party may speak both languages and provide language interpretation. In one embodiment, the multi-handset telephone system 700 may be utilized for language interpretation in the health industry such a hospital, doctor's office, etc. The multi-handset telephone system 700 may also be utilized in other industries.

The multi-handset telephone system 700 may also be utilized without language interpretation. For example, multiple parties may want to have a face-to-face conversation with a remote third party. In one embodiment, the multi-handset telephone system 700 may be utilized for language interpretation in the health industry such a hospital, doctor's office, etc. without language interpretation. The multi-handset telephone system 700 may also be utilized in other industries.

Figure 8:
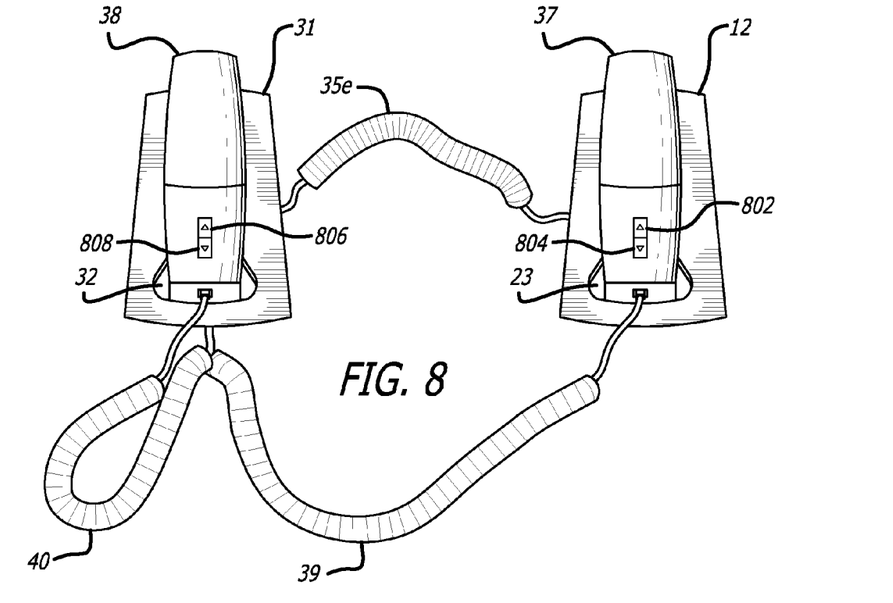
FIG. 8 illustrates a multi-handset telephone system that has an integrated volume control actuator for each of the handsets.

FIG. 8 illustrates a multi-handset telephone system 800 that has an integrated volume control actuator for each of the handsets. Accordingly, a user may adjust the volume of the telephone conversation in each of the handsets. For example, the user of a handset may press an actuator that increases or decreases the volume. The actuator may be a button, a plurality of buttons, a dial, a plurality of dials, etc. For instance, a button with an up arrow and a button with a down arrow may be utilized to adjust the volume. FIG. 8 illustrates an example of a plurality of buttons that control volume on each of the handsets. The first handset 37 has a first handset up button 802 and a first handset down button 804. The second handset 38 has a second handset up button 806 and a second handset down button 808. The integrated volume control actuators may be located on any portion of the handsets, e.g., sides, top, bottom, front, or back. Alternatively, the integrated volume control actuators may be located on a corresponding base.

In one embodiment, less than all of the handsets in the multi-handset telephone system 800 may have an integrated volume control actuator. For example, the first handset may have a volume control actuator and the second handset may not have a volume control actuator.

By having the volume control actuator on each handset, each user has the ability to customize his or her listening experience according to his or her own hearing. For instance, the first user may have a high volume selection whereas the second user may have a low volume selection. As a result, the users do not have to rely on a uniform volume that may be effective for one user, but not effective for the other user. Further, each user may easily change the volume during the conversation because the volume selection is made on a handset itself rather than a base.

The multi-handset telephone system 800 may be utilized for language interpretation. For example, the first user may speak a first language, the second user may speak a second language, and a remote third party may speak both languages and provide language interpretation. In one embodiment, the multi-handset telephone system 800 may be utilized for language interpretation in the health industry such a hospital, doctor's office, etc. The multi-handset telephone system 800 may also be utilized in other industries.

The multi-handset telephone system 800 may also be utilized without language interpretation. For example, multiple parties may want to have a face-to-face conversation with a remote third party. In one embodiment, the multi-handset telephone system 800 may be utilized for language interpretation in the health industry such a hospital, doctor's office, etc. without language interpretation. The multi-handset telephone system 800 may also be utilized in other industries.

The components of any of the configurations described above may be utilized in other configurations. For example, a multi-handset telephone system may have an antimicrobial agent and amplifiers that provide built-in hearing impaired support. Alternatively, a multi-handset telephone system may have an antimicrobial agent and integrated volume control actuators. In yet another alternative, a multi-handset telephone system may have amplifiers that provide built-in hearing impaired support and integrated volume control actuators. A multi-handset telephone system may also have all of these features.

Figure 9:
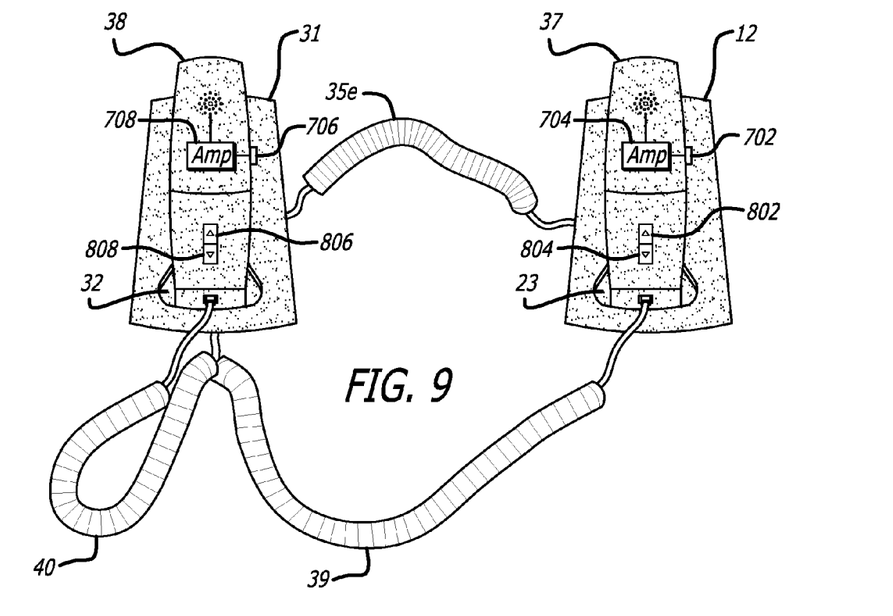
FIG. 9 illustrates a multi-handset telephone system that has a first telephone handset having an antimicrobial agent situated thereon, a first amplifier that provides built in hearing impaired support, and a first integrated volume control actuator.

FIG. 9 illustrates a multi-handset telephone system 900 that had a first telephone handset having an antimicrobial agent situated thereon, a first amplifier that provides built in hearing impaired support, and a first integrated volume control actuator. Further, the multi-handset telephone system 900 has a second telephone handset having the antimicrobial agent situated thereon, a second amplifier that provides built in hearing impaired support, and a second integrated control actuator. The second telephone handset is operably connected to the first handset through a handset cord such that a first user speaks on the first handset and the second user speaks on the second handset to have a face-to face conversation with each other at the same time as having a conversation with a third party remotely The multi-handset telephone system 900 may be utilized for language interpretation. For example, the first user may speak a first language, the second user may speak a second language, and a remote third party may speak both languages and provide language interpretation. In one embodiment, the multi-handset telephone system 900 may be utilized for language interpretation in the health industry such a hospital, doctor's office, etc. The multi-handset telephone system 900 may also be utilized in other industries.

The multi-handset telephone system 900 may also be utilized without language interpretation. For example, multiple parties may want to have a face-to-face conversation with a remote third party. In one embodiment, the multi-handset telephone system 900 may be utilized for language interpretation in the health industry such a hospital, doctor's office, etc. without language interpretation. The multi-handset telephone system 900 may also be utilized in other industries.

The configurations described in FIGS. 6-9 may be utilized with any components of any of the features described in FIGS. 1-5. For example, an antimicrobial agent, amplification for hearing impaired support, and/or or integrated volume control may be implemented with the multi-handset telephone system 10 shown in FIG. 1. However, the configurations described in FIGS. 6-9 may be utilized without the features described in FIGS. 1-5.

The systems described herein may be implemented in a general, multi-purpose or single purpose processor. Such a processor will execute instructions, either at the assembly, compiled or machine-level. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

A computer may be utilized to implement the configurations described herein. A computer is herein intended to include any device that has a general, multi-purpose or single purpose processor as described above. For example, a computer may be a set top box ("STB"), cell phone, portable media player, or the like. The computer may include a processor, a memory, e.g., random access memory ("RAM") and/or read only memory (ROM), and various input/output devices, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands).

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems.

For example, the multi-handset telephone system may be utilized with more than two handsets and respective components. A variety of different fields may utilize the multi-handset telephone system, e.g., language interpretation services, the health care field with or without language interpretation, etc. The multi-handset telephone system can be used for different teleconferencing communication needs.

It is to be understood that aspects of the multi-handset telephone system could be used in other applications such as for conference calling with multiple parties where it is desirable to use handsets. In some instances, a speaker phone may be utilized in conjunction with or as part of the multi-handset telephone system.

Therefore, it is to be understood that, within the scope of the appended claims, the present processes and systems may be practiced other than as specifically described herein.

We claim:

1. A multi-handset telephone system comprising:
a first telephone base having a multi-position switch that receives a digital signal and modifies the digital signal to an analog signal;
a first telephone handset, which is operably connected to the first telephone base, having an antimicrobial agent situated thereon with a chemical coating, a first amplifier that provides built in hearing impaired support, and a first integrated volume control actuator;
a second telephone base that receives the analog signal from the first telephone base;
a second telephone handset, which is operably connected to the second telephone base, having the antimicrobial agent situated thereon with the chemical coating, a second amplifier that provides built in hearing impaired support, and a second integrated volume control actuator, the second telephone handset being operably connected to the first handset through a handset cord such that a first user speaks on the first handset and the second user speaks on the second handset to have a face-to face conversation with each other at the same time as having a conversation with a third party remotely.

2. The multi-handset telephone system of claim 1, wherein the first user speaks a first language, the second user speaks a second language, and the third party is a language interpreter that provides language interpretation for the first user and the second user.

3. The multi-handset telephone system of claim 1, wherein the first user, the second user, and the third party are professionals in a health care industry.

4. The multi-handset telephone system of claim 1, wherein the antimicrobial agent is situated via a coating on an exterior portion of the first telephone handset.

5. The multi-handset telephone system of claim 1, wherein the antimicrobial agent is situated via a coating on an exterior portion of the second telephone handset.

6. The multi-handset telephone system of claim 1, wherein the antimicrobial agent is biocote.

7. The multi-handset telephone system of claim 1, wherein the antimicrobial agent is polygiene.

8. The multi-handset telephone system of claim 1, wherein the first integrated control actuator is a button.

9. The multi-handset telephone system of claim 1, wherein the first integrated control actuator is a dial.

10. The multi-handset telephone system of claim 1, wherein the second integrated control actuator is a button.

11. The multi-handset telephone system of claim 1, wherein the second integrated control actuator is a dial.

12. The multi-handset telephone system of claim 1, wherein the antimicrobial agent is utilized against germs.

13. The multi-handset telephone system of claim 1, wherein the first handset is connected to a first telephone base and the second handset is connected to a second telephone base, the first telephone base being distinct from the second telephone base.

14. The multi-handset telephone system of claim 1, wherein the first handset and the second handset are both connected to a same telephone base.

15. The multi-handset telephone system of claim 1, wherein the first handset has an actuator that receives an input from a user to activate the built in hearing impaired support.

16. The multi-handset telephone system of claim 15, wherein the actuator in the first handset is a button.

17. The multi-handset telephone system of claim 15, wherein the actuator in the first handset is a dial.

18. The multi-handset telephone system of claim 1, wherein the second handset has an actuator that receives an input from a user to activate the built in hearing impaired support.

19. The multi-handset telephone system of claim 18, wherein the actuator in the first handset is a button.

20. The multi-handset telephone system of claim 18, wherein the actuator in the first handset is a dial.

21. A multi-handset telephone system comprising:
a first telephone base having a multi-position switch that receives a digital signal and modifies the digital signal to an analog signal;
a first telephone handset, which is operably connected to the first telephone base, having an antimicrobial agent situated thereon with a chemical coating;
a second telephone base that receives the analog signal from the first telephone base;
a second telephone handset, which is operably connected to the second telephone base, having the antimicrobial agent situated thereon with the chemical coating, the second telephone handset being operably connected to the first handset such that a first user speaks on the first handset and the second user speaks on the second handset to have a face-to face conversation with each other at the same time as having a conversation with a third party remotely, the first user speaking a first language, the second user speaking a second language, and the third party being a language interpreter that provides language interpretation for the first user and the second user.

22. The multi-handset telephone system of claim 21, wherein the first telephone handset has a first amplifier that provides built in hearing impaired support.

23. The multi-handset telephone system of claim 21, wherein the second telephone handset has a second amplifier that provides built in hearing impaired support.

24. The multi-handset telephone system of claim 21, wherein the first telephone handset has a first integrated volume control actuator.

25. The multi-handset telephone system of claim 21, wherein the second telephone handset has a second integrated volume control actuator.

26. The multi-handset telephone system of claim 21, wherein the second telephone handset is operably connected to the first handset through a handset cord.

27. The multi-handset telephone system of claim 21, wherein the antimicrobial agent is situated via a coating on an exterior portion of the first telephone handset.

28. The multi-handset telephone system of claim 21, wherein the antimicrobial agent is situated via a coating on an exterior portion of the second telephone handset.

29. The multi-handset telephone system of claim 21, wherein the antimicrobial agent is biocote.

30. The multi-handset telephone system of claim 21, wherein the antimicrobial agent is polygiene.

31. The multi-handset telephone system of claim 21, wherein the antimicrobial agent is utilized against germs.

32. The multi-handset telephone system of claim 21, wherein the first handset is connected to a first telephone base and the second handset is connected to a second telephone base, the first telephone base being distinct from the second telephone base.

33. The multi-handset telephone system of claim 21, wherein the first handset and the second handset are both connected to a same telephone base.

34. A multi-handset telephone system comprising:
a first telephone base having a multi-position switch that receives a digital signal and modifies the digital signal to an analog signal;
a first telephone handset, which is operably connected to the first telephone base, having an antimicrobial agent situated thereon with a chemical coating;
a second telephone base that receives the analog signal from the first telephone base; and
a second telephone handset, which is operably connected to the second telephone base, having the antimicrobial agent situated thereon with the chemical coating, the second telephone handset being operably connected to the first handset such that a first user speaks on the first handset and the second user speaks on the second handset to have a face-to face conversation with each other at the same time as having a conversation with a third party remotely.

35. The multi-handset telephone system of claim 34, wherein the first user speaks a first language, the second user speaks a second language, and the third party is a language interpreter that provides language interpretation for the first user and the second user.

36. The multi-handset telephone system of claim 34, wherein the first user, the second user, and the third party are professionals in a health care industry.

37. The multi-handset telephone system of claim 34, wherein the first telephone handset has a first amplifier that provides built in hearing impaired support.

38. The multi-handset telephone system of claim 34, wherein the second telephone handset has a second amplifier that provides built in hearing impaired support.

39. The multi-handset telephone system of claim 34, wherein the first telephone handset has a first integrated volume control actuator.

40. The multi-handset telephone system of claim 34, wherein the second telephone handset has a second integrated volume control actuator.

41. The multi-handset telephone system of claim 34, wherein the second telephone handset is operably connected to the first handset through a handset cord.

42. The multi-handset telephone system of claim 34, wherein the antimicrobial agent is situated via a coating on an exterior portion of the first telephone handset.

43. The multi-handset telephone system of claim 34, wherein the antimicrobial agent is situated via a coating on an exterior portion of the second telephone handset.

44. The multi-handset telephone system of claim 34, wherein the antimicrobial agent is biocote.

45. The multi-handset telephone system of claim 34, wherein the antimicrobial agent is polygiene.

46. The multi-handset telephone system of claim 34, wherein the antimicrobial agent is utilized against germs.

47. The multi-handset telephone system of claim 34, wherein the first handset is connected to a first telephone base and the second handset is connected to a second telephone base, the first telephone base being distinct from the second telephone base.

48. The multi-handset telephone system of claim 34, wherein the first handset and the second handset are both connected to a same telephone base.

* * * * *